US Patent 2,760,976 — Patented Aug. 28, 1956

2,760,976

DI-(p-n-BUTYL PHENYL)-THIOUREA

Charles F. Huebner, Morristown, and Caesar Richard Scholz, Summit, N. J., assignors to Ciba Pharmaceutical Products, Incorporated, Summit, N. J., a corporation of New Jersey No Drawing. Application May 2, 1952, Serial No. 285,806

1 Claim. (Cl. 260—552)

The present invention relates to 1,3-diphenyl thioureas wherein the phenyl nuclei are substituted in the para-position with an alkyl or alkoxyalkyl radical, of which the group adjacent the phenyl ring is methylene, and the total number of carbon atoms or the sum of carbon and oxygen atoms, as the case may be, in each radical is 4 or 5.

Despite intensive research for a long time by scientists for chemotherapeutic agents effective against tuberculosis, the results achieved have left much to be desired. A primary object of the present invention is the embodiment of a group of new substances characterized by antituberculosis activity in high degree with a concomitant low toxicity. The substances are adapted to be administered orally.

This object, and others which will appear hereinafter, is realized by the di-(p-substituted phenyl)-thioureas of the present invention, which thioureas correspond to the formula

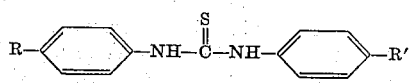

wherein each of R and R' is a butyl or amyl radical or an alkoxyalkyl radical, the sum of carbon and oxygen atoms in which is 4 or 5, and wherein the carbons adjacent the phenyl rings are methylene carbons.

The new compounds, as precedingly defined, are obtained by reacting an appropriately p-substituted aniline with an appropriately p-substituted isothiocyanate, with or without the employment of a solvent such as alcohol, benzene, toluene, propanol and the like. The reaction is carried out as desired either at room temperature (20–30° C.) or at elevated temperature, although as a general rule, application of external heat is unnecessary. The product crystallizes out of the reaction mixture on cooling. Where the p-substituent radicals in the final compound are different, it is immaterial which of the substituents are carried by the aniline or isothiocyanate entering the reaction. Thus, for example, the products may be prepared from different starting materials by using the correct isothiocyanate and amine, as for example as follows in the production of 1-(p-n-butylphenyl)-3-(p-methoxypropyl)-2-thiourea:

(a)

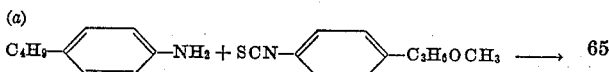

or (b)

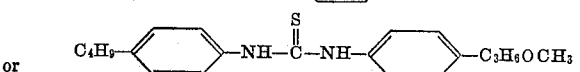

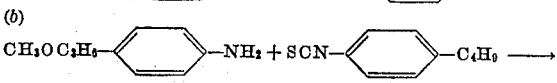

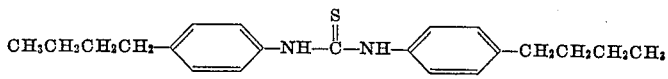

The substituted isothiocyanates are prepared by the method of Dyson [J. Chem. Soc. (London) 436 (1927)], by the action of thiophosgene on the desired substituted aniline. It is not essential that the isothiocyanates be isolated and, if desired, the next step in the process leading to the thiourea may be carried out by adding the desired substituted aniline to the reaction mixture.

The older method of preparing isothiocyanates consisting of reacting the substituted aniline in ammonia with carbon disulfide, preparing the lead salts of the resultant thiocarbamate and decomposing to the isothiocyanate may be used also.

An alternative method for preparing the compounds of the present invention, in those cases wherein the para-substituents are identical, is by reacting the appropriate substituted aniline with carbon disulfide or with thiophosgene. When carbon disulfide is employed, the reaction is carried out in a solvent such as alcohol, dioxane and the like, and may be hastened by employing a third substance such as hydrogen peroxide or a catalytic amount of sulfur, potassium ethyl xanthate or potassium hydroxide. When thiophosgene is employed, there is added to the mixture an alkaline substance such as alkali metal hydroxide or carbonate to react with the hydrochloric acid which is liberated.

The new compounds are useful as therapeutics or as intermediates for the preparation of therapeutically active substances. The new compounds, as aforesaid, possess antituberculosis activity, and in comparison with known antituberculosis agents such as the thiosemicarbazones, are considerably less toxic and of enhanced activity.

The invention is described in greater detail in the examples which follow and which are presented solely by way of illustration and not at all by way of limitation. In the said examples, parts by weight bear the same relation to parts by volume as do grams to milliliters. Temperatures are expressed in degrees centigrade. Melting points are uncorrected.

EXAMPLE 1

20 parts by weight of p-n-butylaniline are refluxed for 4 hours in 100 parts by volume of ethanol with 16 parts by volume of carbon disulfide and 2 parts by weight of potassium ethyl xanthate. On cooling, the resultant thiourea crystallizes in the form of plates. The crystals are filtered out, washed with alcohol and water and recrystallized from ethanol to yield 1,3-bis-(p-n-butylphenyl)-2-thiourea:

CH₃CH₂CH₂CH₂—⟨ ⟩—NH—C(=S)—NH—⟨ ⟩—CH₂CH₂CH₂CH₃ which melts at 149–150°.

By substituting for the p-n-butylaniline, in the preceding paragraph, an equivalent quantity of p-n-amylaniline, there is obtained the corresponding 1,3-bis-(p-n-amylphenyl)-2-thiourea, which melts at 152–154°.

EXAMPLE 2

22 parts by weight of p-iso-amylaniline are refluxed for 4 hours in 100 parts by volume of ethanol with 16 parts by volume of carbon disulfide and 2 parts by weight of potassium ethyl xanthate. On cooling, the resultant thiourea crystallizes in the form of plates. The crystals are filtered out, washed with alcohol and water and recrystallized from ethanol to yield 1,3-bis-(p-iso-amyl-phenyl)-2-thiourea:

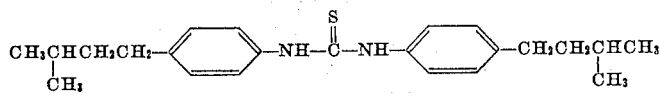

which melts at 147–148°.

EXAMPLE 3

45 parts by weight of methyl-β-phenylethylether are added dropwise to 120 parts by volume of well-stirred mixed acid [equal parts by volume of sulfuric acid (d. 1.84) and nitric acid (d. 1.42)] while the temperature is held at −30° by external cooling. After reaction, the mixture is allowed to warm up to −10° and poured into an excess of chipped ice. The partly crystalline mixture of nitration isomers is filtered at 0°, the oily o-isomer being separated from the crystalline p-nitro-(β-methoxy-ethyl)-benzene. The p-isomer may be crystallized from ether; it melts at 60–61°.

22.8 parts by weight of this p-isomer are dissolved in 100 parts by volume of ethanol and hydrogenated at 50 pounds per square inch pressure over a Raney nickel catalyst until three molar equivalents of hydrogen are taken up (about 6 hours). The catalyst is filtered off, 2 parts by weight of potassium ethyl xanthate and 15.5 parts by volume of carbon disulfide added to the solution containing p-(β-methoxyethyl)-aniline and the mixture refluxed 4 hours. On concentration and cooling, the reaction product crystallizes out and is recrystallized from ethanol to yield 1,3-bis-[p-(β-methoxyethyl)-phenyl]-2-thiourea:

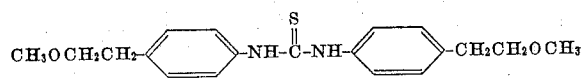

which melts at 118–120°.

EXAMPLE 4

25.4 parts by weight of p-nitro-ethoxymethyl-benzene are hydrogenated at 50 pounds per square inch pressure in ethanol over Raney nickel catalyst in 100 parts by volume of ethanol until three molar equivalents of hydrogen are absorbed to yield p-ethoxymethylaniline. The solution, after removal of the catalyst by filtration, is reacted as described in Example 3 with carbon disulfide and potassium ethyl xanthate to yield 1,3-bis-[p-(ethoxymethyl)-phenyl]-2-thiourea, which after recrystallization from ethanol melts at 115°.

In precisely analogous manner, the 1,3-bis-[p-(propoxymethyl)-phenyl]-2-thiourea can be prepared from the corresponding p-nitro-propoxymethylbenzene.

EXAMPLE 5

50 parts by weight of γ-phenylpropylbromide are refluxed overnight with 167 parts by volume of 1.5 normal sodium methoxide in methanol. The mixture is cooled and the sodium bromide filtered off. The solvent is removed and the reaction product, γ-methoxypropylbenzene, distilled at 205–210°.

13.9 parts by weight of this ether are added dropwise to 40 parts by volume of mixed acid (see Example 2) with stirring and cooling to −20°. After completion of the reaction, the mixture is allowed to warm to 0° and poured into an excess of ice water. The p-nitro isomer crystallizes and is separated from the oily o-nitro isomer by filtration. It is recrystallized from hexane; melting point 42–49°.

11.5 parts by weight of the thus-prepared p-nitro-(γ-methoxypropyl)-benzene are reduced in ethanol over Raney nickel at 50 pounds per square inch pressure and, after removal of the catalyst, are refluxed with 7.1 parts by volume of carbon disulfide and 0.5 part by weight of potassium ethyl xanthate for 6 hours. The mixture is diluted with water and the thiourea which separates is collected and recrystallized from ethanol to yield 1,3-bis-[p-(γ-methoxypropyl)-phenyl]-2-thiourea:

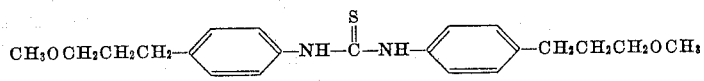

which melts at 113–115°.

EXAMPLE 6

To a vigorously stirred suspension of 10.2 parts by volume of thiophosgene in 100 parts by volume of water are added dropwise with cooling to maintain the temperature at 15°, 20 parts by weight of p-n-butylaniline in 65 parts by volume of chloroform. After stirring for 15 minutes following addition of the amine, the chloroform layer is separated and the crude p-butylphenylisothiocyanate extracted and distilled at 150–154.5° at 14 mm. pressure.

2.0 parts by weight of this isothiocyanate are dissolved in 5 parts by volume of ethanol and allowed to react with 1.7 parts by weight of p-n-amylaniline dissolved in 5 parts by volume of ethanol. After the spontaneous heating of the mixture due to the reaction has subsided, the mixture is allowed to cool to room temperature and the product filtered and recrystallized from ethanol to yield 1-(p-n-amylphenyl)-3-(p-n-butylphenyl-2-thiourea:

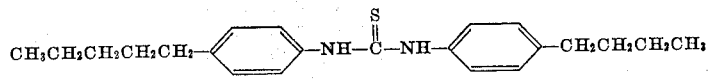

which melts at 144–146°.

By substituting an equivalent amount of p-iso-amylaniline for the p-n-amylaniline in the process of this example, there is obtained the corresponding 1-(p-iso-amylphenyl)-3-(p-n-butylphenyl)-2-thiourea, which melts at 140–141°.

By preparing p-iso-amylphenylisothiocyanate from p-isoamylaniline according to the process described above and reacting it with p-n-amylaniline as described above, there is obtained 1 - (p - n - amylphenyl) - 3 - (p - iso-amylphenyl)-2-thiourea; melting point 140–141°.

EXAMPLE 7

4.16 parts by weight of p-(β-methoxyethyl)-aniline, prepared as precedingly described, are dissolved in 15 parts by volume of ethanol and reacted with 5.3 parts by weight of p-n-butyl-phenylisothiocyanate in 15 parts by volume of ethanol. The product which crystallizes is recrystallized from ethanol to yield 1-(p-n-butylphenyl)-3-[p-(β-methoxyethyl)-phenyl]-2-thiourea:

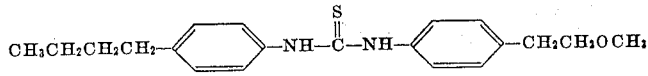

which melts at 137–138°.

By substituting p-iso-amylphenylisothiocyanate for the p-n-butylphenylisothiocyanate, there is obtained 1-(p-iso-amylphenyl) - 3 - [p - (β - methoxyethyl) - phenyl] - 2-thiourea; melting point 135–136°.

The new compounds have been found to be useful, for example, in the treatment of mice infected with the human strain of tubercle bacillus, such as for example, mycobacterium tuberculosis, strain H 37 Rv. In the treatment of thus-infected mice, where the degree of infection is such that 50% of the animals are dead by the 20th day after infection, the mice are fed the new compound according to this invention incorporated in the diet at 0.5% concentration by weight for 30 days followed by the diet without the said compound. A compound is considered to show good antitubercular activity if 50% or more of the animals are alive on the 35th day after infection. Some compounds show good activity at dose levels ranging from 0.1% down to 0.005% concentration in the diet. Some of the compounds of the invention may be fed at concentrations of 3% without causing noticeable ill effects.

When streptomycin is tested according to this method at a dose level of ½ mg. per 20-gram mouse administered subcutaneously daily for 21 days, 50% or more of the mice will survive 35 days after infection. When mice are fed para-amino-salicylic acid under the conditions described above, 50% or more will survive 35 days at a dose level of 0.5% concentration in the diet. At a concentration of 0.25% the survival results are variable.

Representative results are summarized in the following table:

*Antituberculosis activity*

| Compound R—⟨phenyl⟩—NH—C(=S)—NH—⟨phenyl⟩—R' | | Concentration of Drug in Feed, Percent by Weight | Percent Animals Surviving on 35th Day |
|---|---|---|---|
| R | R' | | |
| n-C$_4$H$_9$— | n-C$_4$H$_9$— | 0.5 | 100 |
| | | 0.005 | 60 |
| n-C$_5$H$_{11}$— | n-C$_5$H$_{11}$— | 0.5 | 100 |
| iso C$_5$H$_{11}$— | iso C$_5$H$_{11}$— | 0.5 | 100 |
| | | 0.05 | 100 |
| | | 0.025 | 90 |
| CH$_3$OC$_2$H$_4$— | CH$_3$OC$_2$H$_4$— | 0.5 | 100 |
| | | 0.025 | 90 |
| CH$_3$OC$_3$H$_6$— | CH$_3$OC$_3$H$_6$— | 0.5 | 100 |
| | | 0.025 | 80 |
| CH$_3$— | CH$_3$— | 0.5 | *0 |
| iso C$_3$H$_7$— | iso C$_3$H$_7$— | 0.5 | *10 |
| t-C$_4$H$_9$— | t-C$_4$H$_9$— | 0.5 | *10 |
| n-C$_6$H$_{13}$— | n-C$_6$H$_{13}$— | 0.5 | *30 |

*The results designated by asterisk relate to compounds outside the scope of the present invention and are included solely for purposes of comparison.

Having thus disclosed the invention what is claimed is: 1,3-bis-(p-n-butylphenyl)-2-thiourea.

References Cited in the file of this patent
UNITED STATES PATENTS

| 2,263,730 | Hentrich et al. | Nov. 25, 1941 |
| 2,285,184 | Bousquet et al. | June 2, 1942 |

FOREIGN PATENTS

| 346,565 | France | Dec. 1, 1904 |

OTHER REFERENCES

Hickinbottom et al.: "J. Chem. Soc." (London), 1930, p. 1570.

Hickinbottom et al.: "J. Chem. Soc." (London), 1932, p. 2398.

Mainzer: "Ber. Deut. Chem.," vol. 16 (1883), pp. 2016–18.

Pahl: "Ber. Deut. Chem.," vol. 17 (1884), pp. 1232 and 1242.

Effront: "Ber. Deut. Chem.," vol. 17 (1884), pp. 2335, 2344 and 2349.

Braun: "Ber. Deut. Chem.," vol. 39 (1906), p. 4374.